Figure 1:
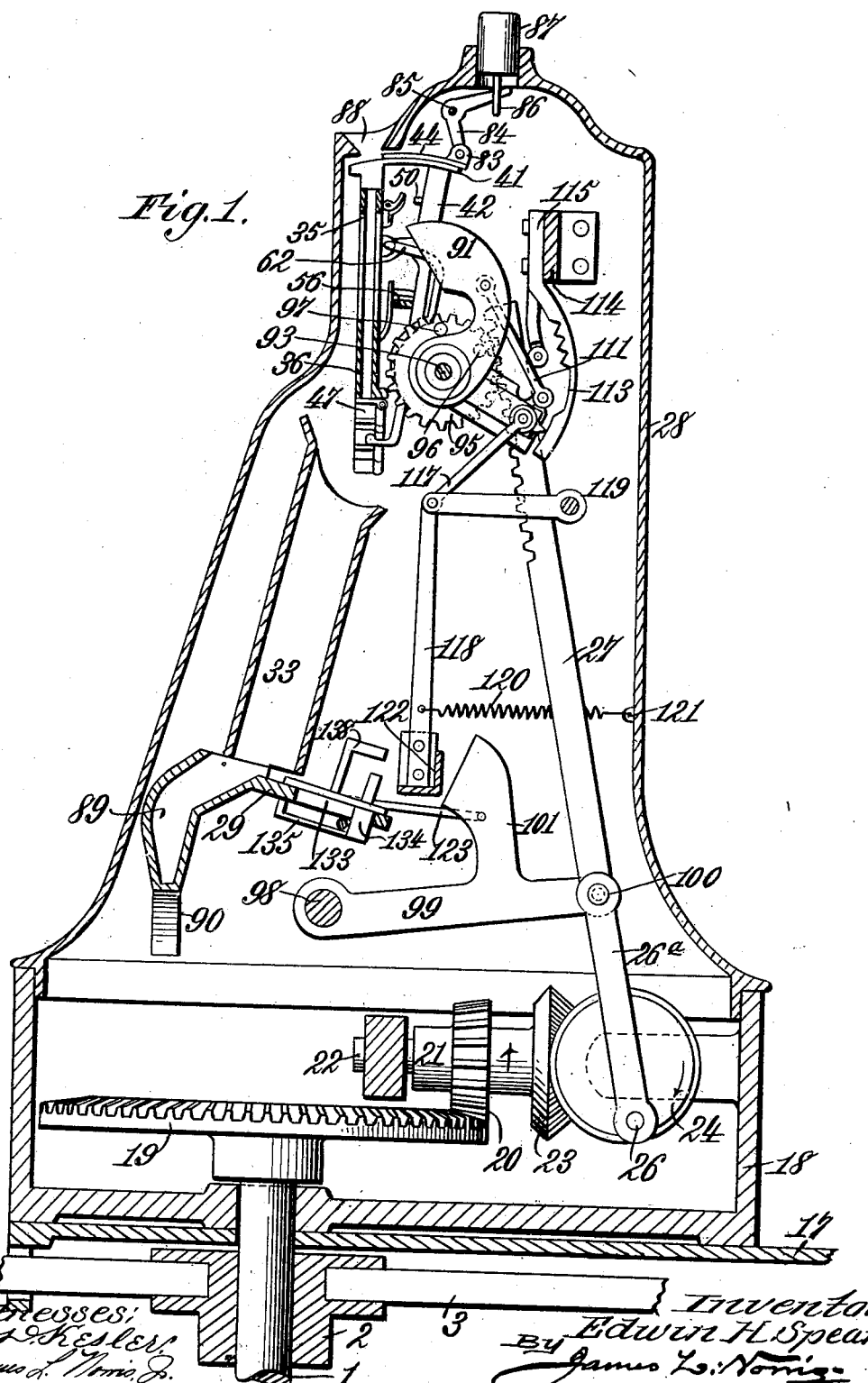

No. 761,016. PATENTED MAY 24, 1904.
E. H. SPEAR.
CASH RECEIVING AND CHANGE MAKING APPARATUS FOR TURNSTILES.
APPLICATION FILED SEPT. 2, 1903.
NO MODEL.
8 SHEETS—SHEET 1.

No. 761,016. PATENTED MAY 24, 1904.
E. H. SPEAR.
CASH RECEIVING AND CHANGE MAKING APPARATUS FOR TURNSTILES.
APPLICATION FILED SEPT. 2, 1903.
NO MODEL.
8 SHEETS—SHEET 2.
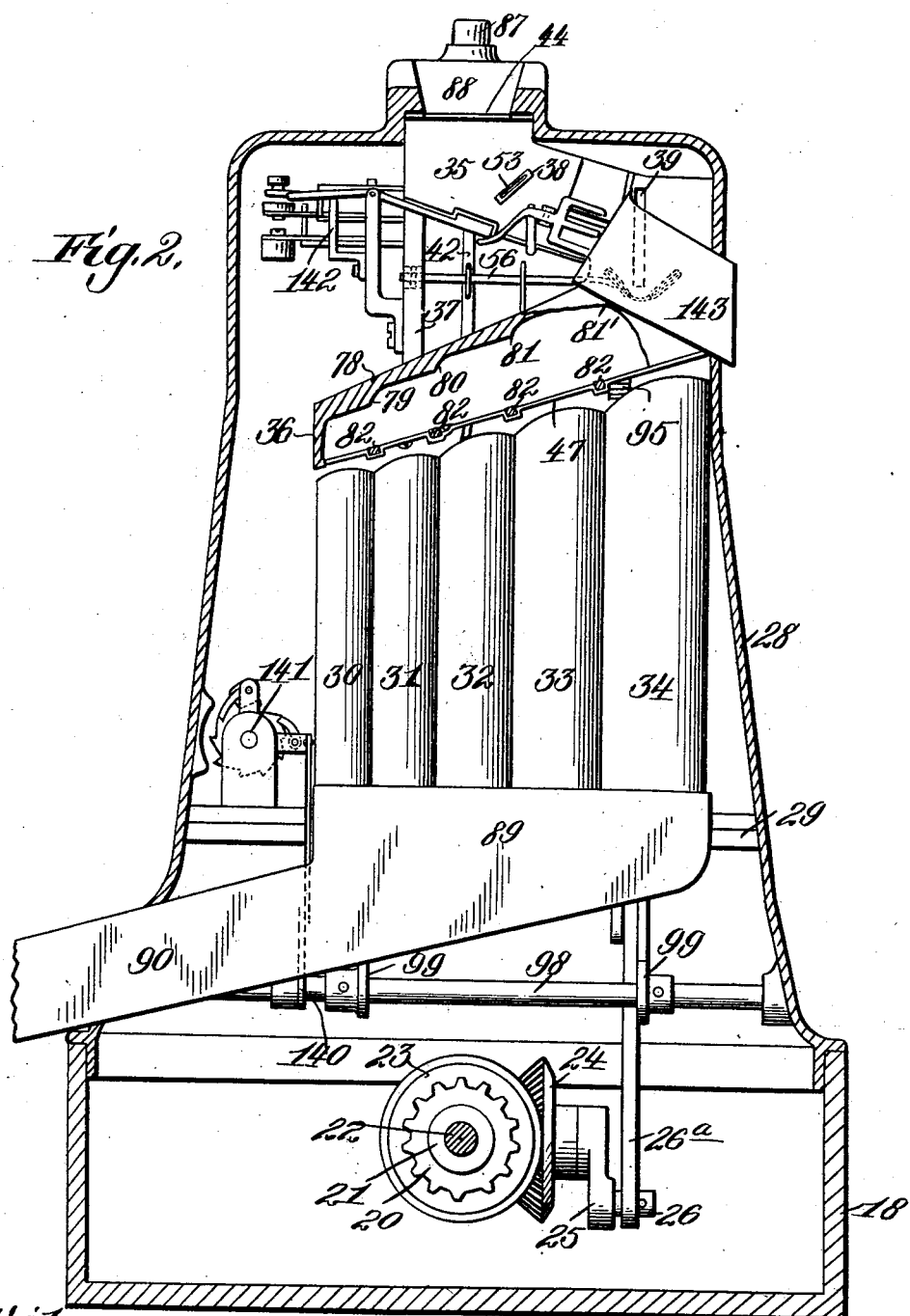

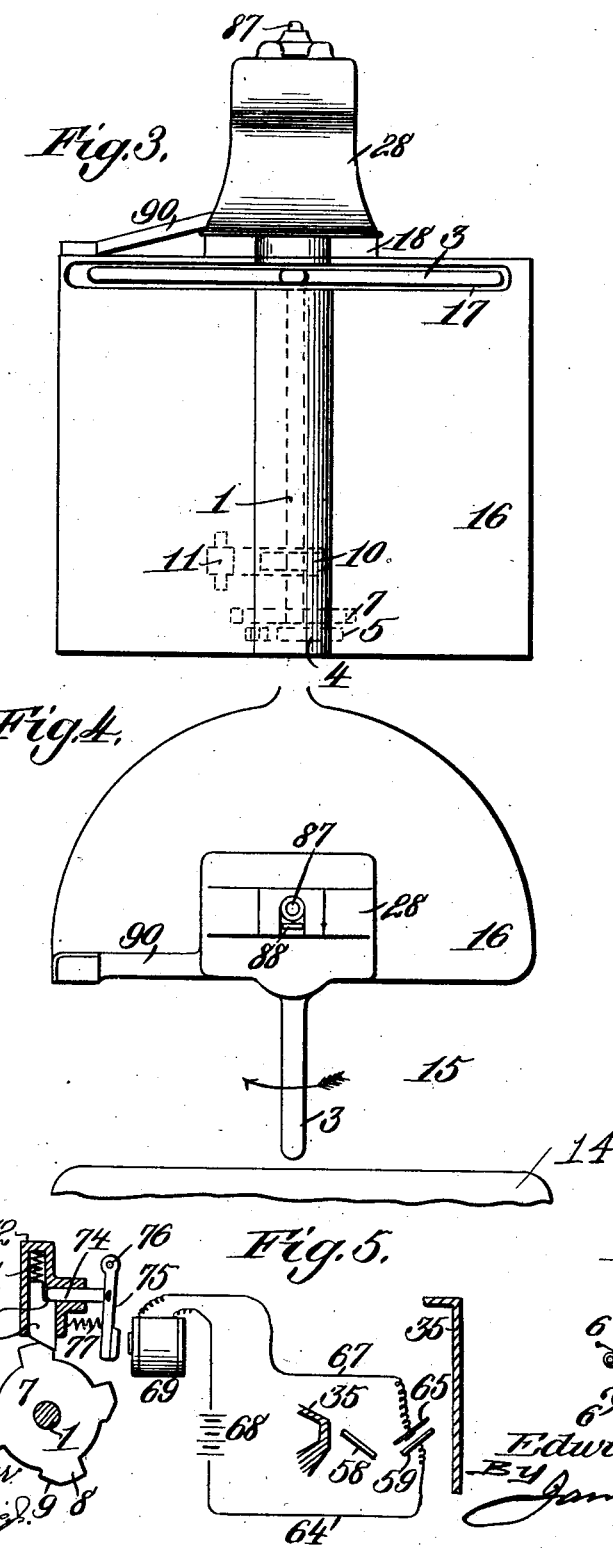

No. 761,016. PATENTED MAY 24, 1904.
E. H. SPEAR.
CASH RECEIVING AND CHANGE MAKING APPARATUS FOR TURNSTILES.
APPLICATION FILED SEPT. 2, 1903.
NO MODEL.
8 SHEETS—SHEET 4.
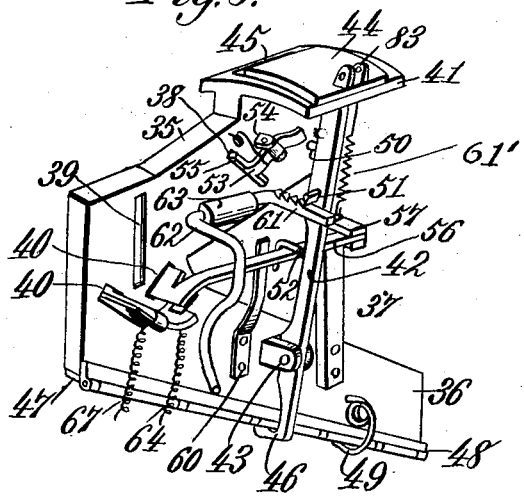
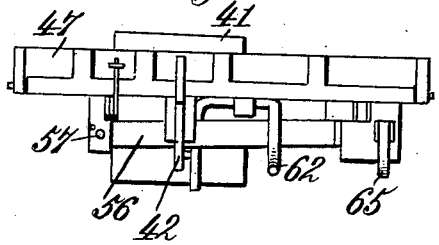
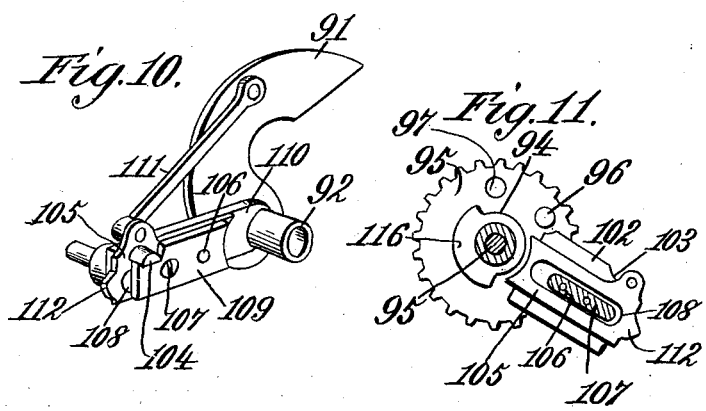
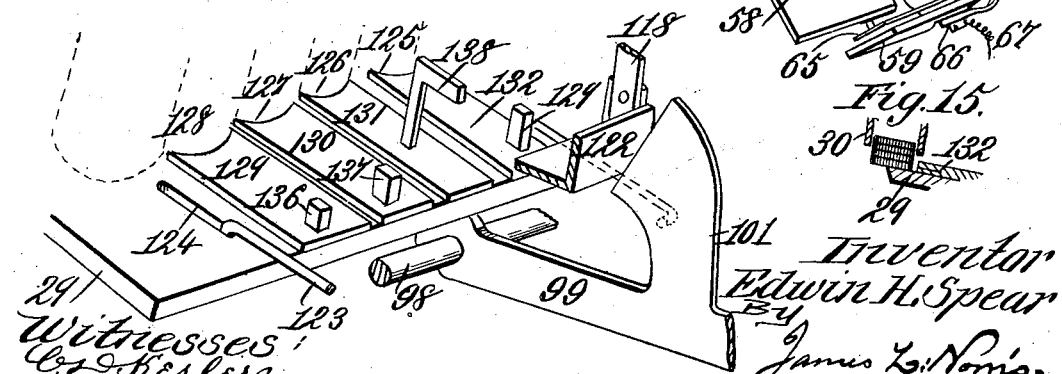
Inventor
Edwin H. Spear
By James L. Norris.
Atty.
Witnesses No. 761,016. PATENTED MAY 24, 1904.
E. H. SPEAR.
CASH RECEIVING AND CHANGE MAKING APPARATUS FOR TURNSTILES.
APPLICATION FILED SEPT. 2, 1903.
NO MODEL. 8 SHEETS—SHEET 5.

Witnesses
C. D. Kesler
James L. Norris, Jr.

Inventor
Edwin H. Spear
By
James L. Norris
Atty

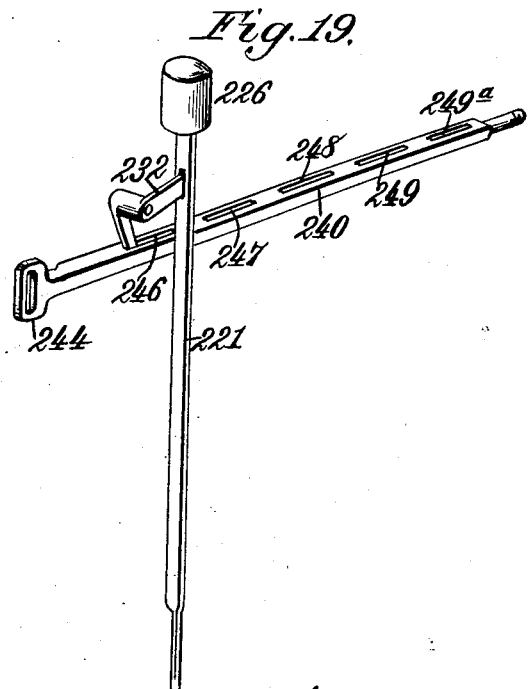

No. 761,016. PATENTED MAY 24, 1904.
E. H. SPEAR.
CASH RECEIVING AND CHANGE MAKING APPARATUS FOR TURNSTILES.
APPLICATION FILED SEPT. 2, 1903.
NO MODEL.
8 SHEETS—SHEET 7.
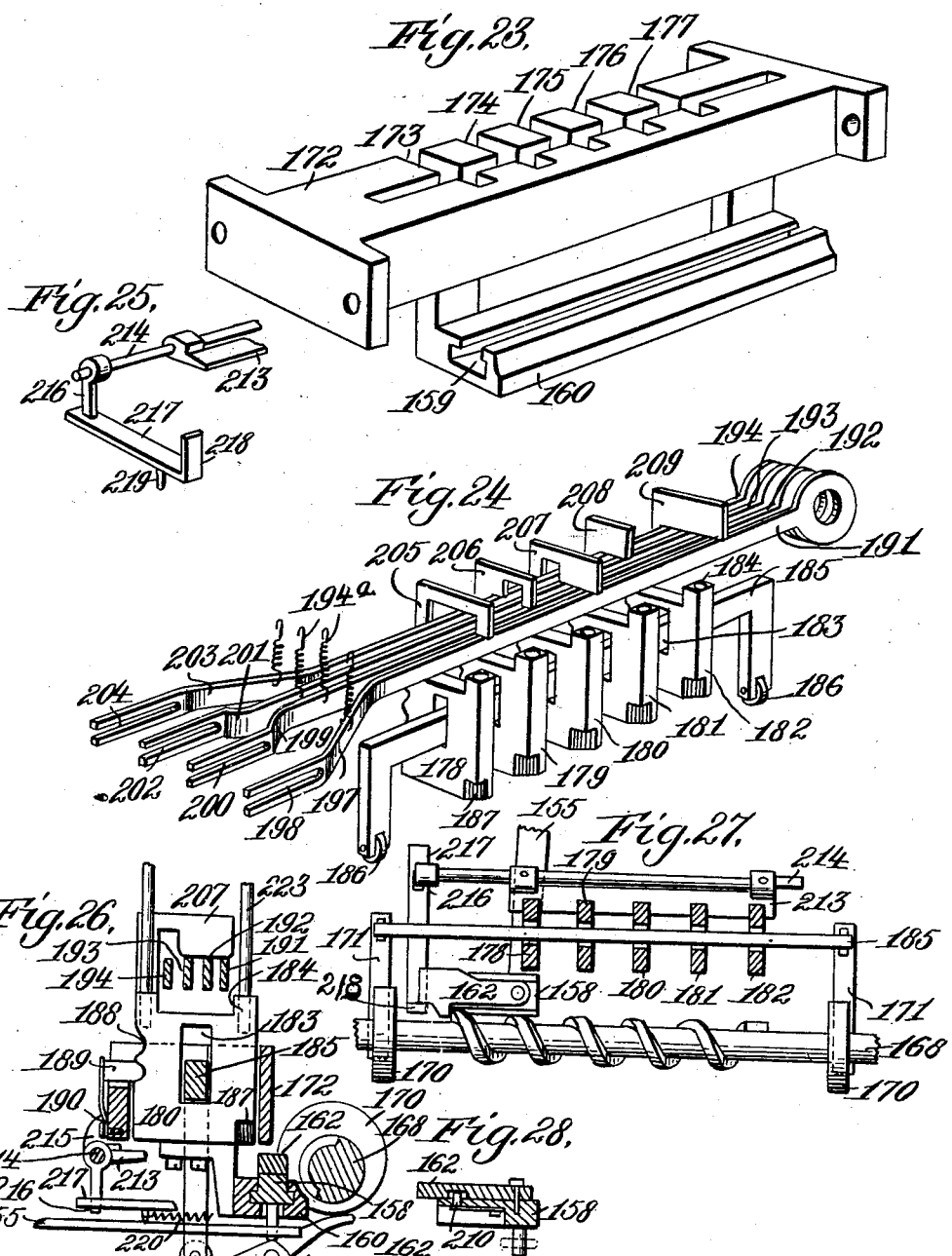
Witnesses:
C. D. Kesler,
James L. Norris, Jr.
Inventor
Edwin H. Spear
By James L. Norris.
Atty.

No. 761,016. PATENTED MAY 24, 1904.
E. H. SPEAR.
CASH RECEIVING AND CHANGE MAKING APPARATUS FOR TURNSTILES.
APPLICATION FILED SEPT. 2, 1903.
NO MODEL.
8 SHEETS—SHEET 8.
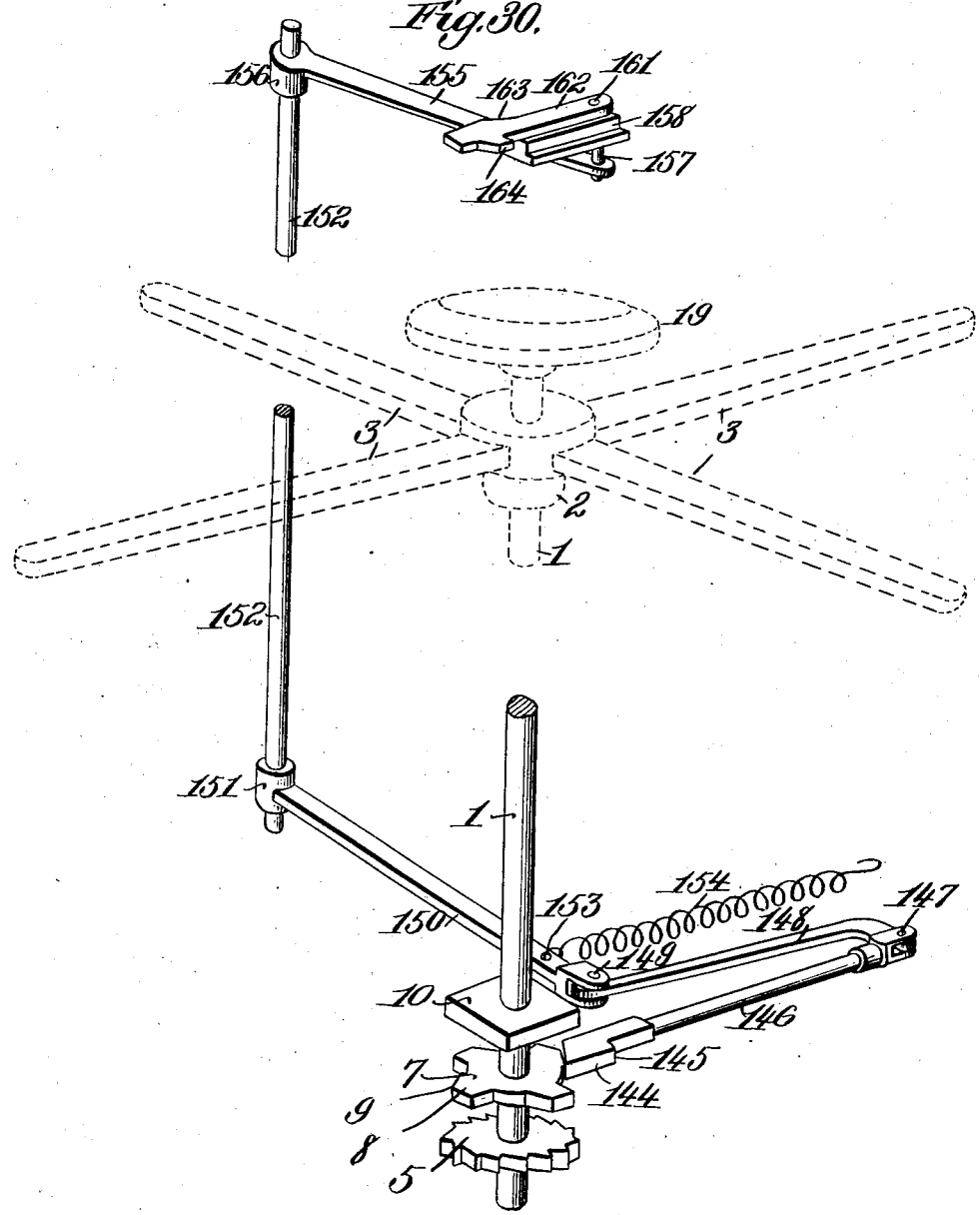

No. 761,016. Patented May 24, 1904.

UNITED STATES PATENT OFFICE.

EDWIN H. SPEAR, OF NEW YORK, N. Y., ASSIGNOR TO THE F. S. M. SYNDICATE, LIMITED, OF LONDON, ENGLAND.

CASH-RECEIVING AND CHANGE-MAKING APPARATUS FOR TURNSTILES.

SPECIFICATION forming part of Letters Patent No. 761,016, dated May 24, 1904.

Original application filed January 3, 1903, Serial No. 137,719. Divided and this application filed September 2, 1903. Serial No. 171,702. (No model.)

*To all whom it may concern:*

Be it known that I, EDWIN H. SPEAR, a citizen of the United States, residing at New York, in the county of New York and State of New York, have invented new and useful Improvements in Cash-Receiving and Change-Making Apparatus for Turnstiles, of which the following is a specification.

This invention relates to certain new and useful improvements in cash-receiving and change-giving apparatus for turnstiles, and is a division of my application for Letters Patent, Serial No. 137,719, filed January 3, 1903.

This invention aims to construct an apparatus of the class referred to for receiving the cost of an admission and for ejecting the amount of change between the value of the money inserted in payment for the admission and the cost of admission when the value of the money inserted is greater than the cost of admission, for receiving at one time the cost of more than one admission and for ejecting the amount of change necessary between the value of the money inserted in payment for the several admissions and the cost of the several admissions when the value of the money inserted is greater than the cost of the several admissions, and for storing the money tendered for the cost of admission according to its value.

With the above and other objects in view the invention aims to construct a cash-receiving and change-giving apparatus for turnstiles which shall be simple in its construction, strong, durable, efficient in its use, and comparatively inexpensive to set up.

To this end the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 16:
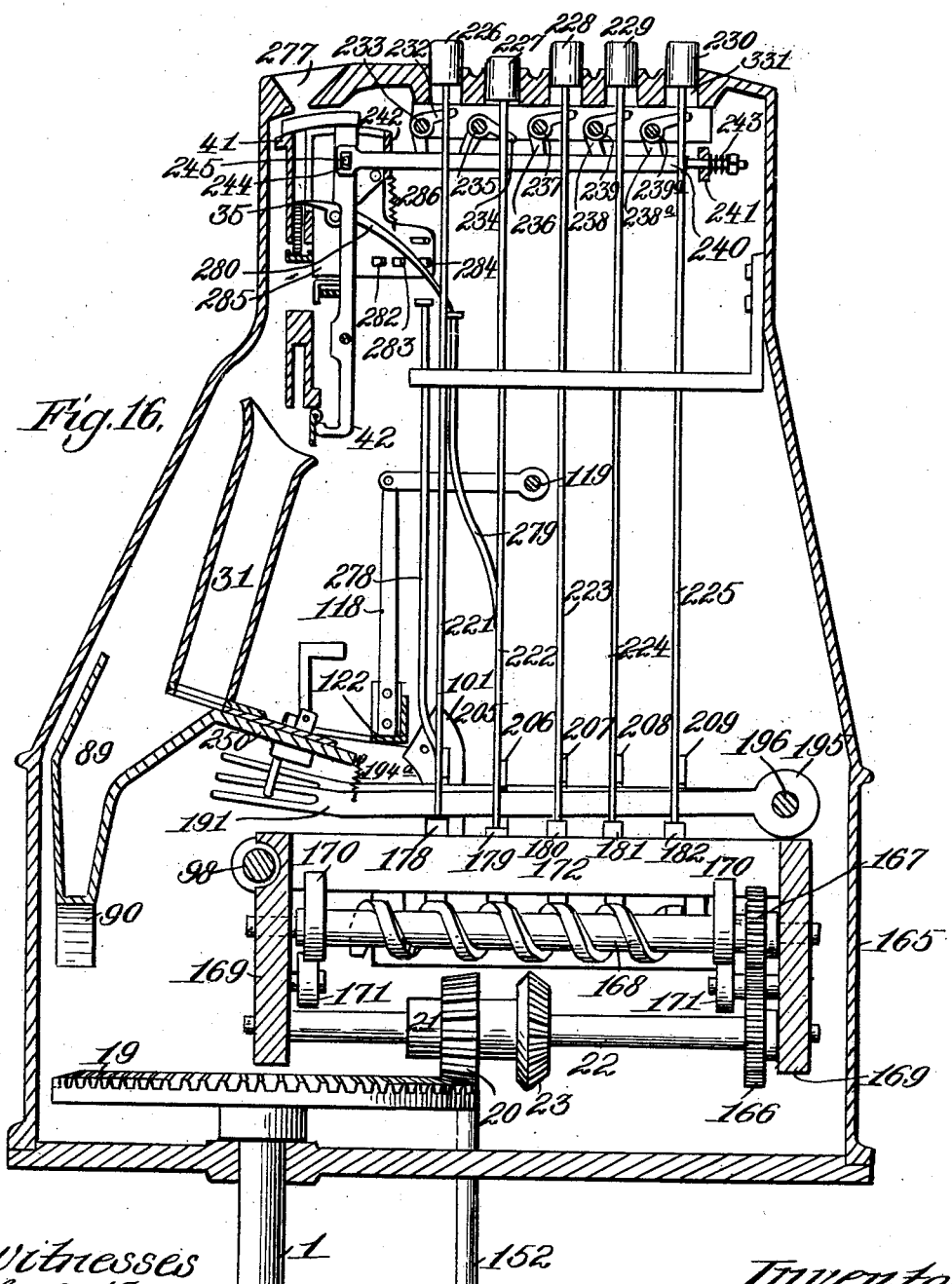

Figure 1 is a sectional elevation of the apparatus as constructed for the payment of a single admission to permit of the passage of a single person. Fig. 2 is a front sectional elevation of the apparatus, showing the coin tubes and receptacles, the coin-receiving pan, the coin-delivering chute, the registering mechanism, and detecting mechanism. Fig. 3 is a side elevation of the entire apparatus as inclosed, showing the entrance or passage way. Fig. 4 is a top plan view of the apparatus as inclosed, showing the entrance or passage way. Fig. 5 is a sectional plan of the locking and releasing mechanism for the turnstile. Fig. 6 is a detail of the throwing device for the turnstile for imparting the necessary movement to the turnstile if it is retarded. Fig. 7 is a detail view of the locking pawl and ratchet to arrest the movement in one direction of the turnstile. Fig. 8 is a perspective view of the coin receiving and separating mechanism. Fig. 9 is an inverted plan view thereof. Fig. 10 is a perspective view of the feeling-finger for controlling the operation of the change-ejecting mechanism. Figs. 11 and 12 are sectional details of the controlling mechanism for the change-ejecting mechanism. Fig. 13 is a detail of the coin receiving and separating mechanism, showing the device for forming the electrical circuit to operate the releasing mechanism for the locking mechanism. Fig. 14 is a plan, partly in section, of the change-ejectors and the operating means therefor. Fig. 15 is a sectional detail of the lower portion of the coin-receptacle and one of the change-ejectors. Fig. 16 is a sectional elevation of the apparatus constructed for the payment of one and more than one admission. Fig. 17 is a detail of the operating means of the locking mechanism for the controlling-blocks employed in the construction set forth in Fig. 16. Fig. 18 is a detail view of the feeling-finger used in the construction for the payment of one and more than one fare. Fig. 19 is an elevation of one of the push-rods for the controlling-blocks and one of its connections employed in the construction shown by Fig. 16. Fig. 20 is a sectional elevation of the change-ejecting mechanism employed in the construction set forth in Fig. 16. Fig.

21 is a longitudinal sectional elevation of the change-ejecting mechanism employed in the construction set forth in Fig. 16. Fig. 22 is an elevation of the change-ejecting mechanism and its operating means employed in the construction set forth in Fig. 16. Fig. 23 is a perspective view of the supporting means for the controlling-blocks and guideway for the controlling-pawl. Fig. 24 is a perspective view of the controlling-blocks and regulating-bars arranged in relation to one another. Fig. 25 is a detail of the releasing mechanism for the controlling-pawl. Fig. 26 is a longitudinal sectional view of the regulating-bars, controlling-blocks, and their connections. Fig. 27 is a sectional plan view of the controlling-blocks, operating worm-shaft, and which shows the normal position of the controlling-pawl. Figs. 28 and 29 are sectional details of the controlling-pawl and its supporting means; and Fig. 30 is a perspective view of the turnstile-shaft, the radial arms being shown in dotted lines, and the operating means for the controlling-pawl, showing the same arranged in relation to the turnstile-shaft as employed in the construction set forth by Fig. 16.

Referring to Figs. 1 to 15, inclusive, of the drawings, which illustrate the mechanism used in conjunction with the turnstile for delivering the difference between the cost of a single admission and the amount of cash inserted, as well as releasing the turnstile to permit of the passage of a person, 1 denotes the vertical shaft of the turnstile, which carries near its upper end the fixed sleeve 2, provided with the radially-extending arms 3. The lower end of the shaft 1 is mounted in a suitable bearing 4 and above its lower end carries the ratchet-wheel 5, adapted to be engaged by the dogs or pawls 6 for arresting movement in one direction of the turnstile. Above the ratchet-wheel 5 upon the shaft 1 is mounted a locking-disk 7. The latter is provided with four radially-extending locking-ears 8, having one side thereof beveled, as at 9. Fixed upon the shaft 1 a suitable distance above the locking-disk 7 is a square disk 10, engaged by a pivoted throwing-arm 11, having a pin 12, carrying a coiled compression-spring 13. The function of the disk 10 and the spring-pressed throwing-arm 11 will be hereinafter referred to.

The reference character 14 denotes one wall of the entrance-way 15, or, in other words, the passage through which a person is permitted to pass when the turnstile is released, and one of the radial arms 3 of the turnstile is adapted to project transversely of the passage 15 to close it. (See Fig. 4.)

The reference character 16 denotes a support in the form of a casing and upon which is mounted the coin receiving, separating, ejecting, and delivering mechanisms and which is also adapted to have arranged therein the locking mechanism, to be hereinafter referred to, and this support also forms the other wall of the entrance-way 15. The support or casing 16 is provided with an elongated opening 17 to permit of the movement of the radial arms 3 when the turnstile is operated. The pawls 6 and the spring-pressed throwing-arm 11 are pivoted in any suitable manner to and within the support 16, so as to engage, respectively, the ratchet-wheel 5 and the disk 10.

Extending through the top 17 of the support 16 is the upper end of the shaft 1. This upper end of the shaft 1 projects into a casing 18 and carries a beveled-face gear 19, which is adapted to engage and operate the gear-wheel 20, carried by the sleeve 21, mounted upon the operating-shaft 22. The size of the gear 19 is such that one revolution thereof will rotate the gear 20 four times, or four revolutions of the gear-wheel 20 will equal but one revolution of the gear-wheel 19. This is necessary, owing to the fact that the radial arms 3 extend substantially at ninety degrees, one hundred and eighty degrees, two hundred and seventy degrees, and three hundred and sixty degrees, as the movement of one arm, which is ninety degrees, permits of the passage of one person. When one of the radial arms 3 extends transversely of the passage-way 15, the latter is closed. The shaft 22 is supported in any suitable manner within the casing 18, and the sleeve 21, carried thereby, is further provided at one end with a bevel-gear 23, meshing with and operating the bevel-gear 24, which is provided with a crank-arm 25. The gear 24 is supported in the casing 18 in any suitable manner, and the crank-arm 25 thereof is connected, as at 26, to the link 26$^a$, which is connected to the vertically-extending rack-bar 27, this bar at its upper end being provided with teeth, and the function thereof will be hereinafter referred to.

The coin changing and ejecting, separating, and receiving mechanisms are arranged in a casing 28, mounted upon the casing 18. Within the casing 28 is suitably secured a transversely-extending supporting-plate 29, which is at the forward portion of the casing 28 and extends upwardly at a suitable inclination. This plate 29 is adapted to support the coin tubes or receptacles 30, 31, 32, 33, and 34. The coin tube or receptacle 30 is for the dimes, the tube 31 for the nickels, the tube 32 for the quarters, the tube 33 for the half-dollars, and the tube 34 for the dollars. The coin tubes or receptacles are arranged in the casing 28 so that their upper ends will be below what may be termed the "coin receiving and separating" mechanism and their lower ends above what may be termed the "coin changing and ejecting" mechanism. Any suitable form of coin-tubes can be employed; but the preferred form of construction is such that the tubes are formed of two sections pivoted together, so that when access is had at the front of the casing 28 to the interior thereof one section of the tubes can be swung outwardly and the coins removed. It may be well to state that the casing 28 can be formed of a series of detachable plates, if desired, or any other form of construction can be used so that access can be had to the interior thereof.

The coin receiving and separating mechanism consists of an upper chute 35 and a lower chute 36, communicating with each other at one end. The upper chute 35 extends downwardly at an inclination, as well as the lower chute 36; but the lower chute 36 extends in an opposite direction to that of the chute 35 and is somewhat longer. The two chutes are suitably connected together and also spaced apart by means of a vertically-extending rod 37. The chute 35 near its upper end is formed with a slightly-inclined slot 38 and at its lower end with a vertically-extending slot 39. At the upper end of the chute 36, at the top thereof where it joins the slot 35, a pair of slots 40 are formed, which extend diagonally in opposite directions. The slots 38, 39, and 40 extend entirely through their respective chutes. Extending rearwardly at the upper end of the chute 35 is a curved plate 41, having a longitudinally-extending slot and through which extends the upper end of an elongated trip-lever 42, pivoted, as at 43, to the rear of the lower chute 36. The upper end of the trip-lever 42, which extends through the opening in the plate 41, is fixedly connected to an actuating-slide 44 movable upon the upper face of the plate 41 and is adapted to close or open the entrance 45 of the chute 35. The lower end of the trip-lever 42 is provided with a hook 46, which is adapted to engage and retain against the discharge end of the chute 36 the closure-plate 47 therefor. The plate 47 is pivoted to the bar 48, carried by the chute 36, and is also connected to the spring 49, suitably secured to the chute 36. The function of the spring 49 is that when the hooked end 46 of the lever 42 is released from its engagement with the plate 47 the spring 49 will move the plate 47 away from the discharge end of the chute 36, so as to open the same and permit the discharge of a coin in a manner hereinafter referred to.

The trip-lever 42 has projecting from its forward edge, near the upper end thereof, a stud 50, a beveled lug 51, extending from one side thereof and an L-shaped arm 52 projecting from its forward edge approximately centrally thereof. The function of the stud 50, the beveled lug 51, and L-shaped arm 52 will be hereinafter referred to.

The reference character 53 denotes what may be termed a "stop-lever," which is pivoted in the studs 54 on the back of the chute 35 and is provided with an offset extending at an angle thereto, as at 55, this offset extending normally through the slot 38 and forms a stop for a coin in a manner hereinafter described. The lever 53 is provided with a suitable spring for returning it to its normal position after the lever is actuated by means of the stud 50, carried by the trip-lever 42, the latter being operated in a manner as hereinafter set forth.

The reference character 56 denotes what may be termed a "holding-arm," which is pivoted at one end, as at 57, to the bar 37 and at its other end carries a pair of forwardly-projecting offsets 58 and 59. These offsets 58 59 are arranged to extend in a diagonal manner in an opposite direction to one another and adapted to project through the slots 40. The arm 56 is partly surrounded by the L-shaped arm 52 of the lever 42. When the lever 42 is moved in a manner hereinafter described, it will carry the holding-arm 56 therewith and move the offsets 58 and 59 in the slots 40, and when the lever 42 is returned to its normal position the L-shaped arm 52 will carry the holding-arm 56 therewith, the said arm 56 moving the offsets 58 59 out of the slots 40. The return movement of the arm 56 is also assisted by means of the leaf-spring 60, which has its lower end connected to the chute 36 and its upper end bearing against the arm 56.

When the lever 42 is moved forwardly, it is locked in position by means of the beveled stud 51 engaging in the pivoted rack-bar 61. The latter is connected to or integral with one end of a rocking arm 62, journaled in the sleeve 63, secured to the rear of the chute 35. The free end of the rocking arm 62 is bent rearwardly and then downwardly over the holding-arm 56 and is engaged and operated in a manner hereinafter described so as to lower the rack-bar 61 out of engagement with the stud 51, thereby releasing the trip-lever 42 and permitting the lever 42 to return to its normal position.

The offset 58 is an integral portion of the holding-arm 56, while the offset 59 is suitably connected to the holding-arm, as well as being insulated therefrom and from the offset 58. To the offset 59 is connected the positive wire 64 of an electrical circuit. The offset 59 also carries a contact-spring 65, which is secured to the lower face of the offset 59, as at 66, and extends around and over the upper face of the said offset 59. The spring 65 has connected thereto the negative wire 67 of the electrical circuit. When the contact-spring 65 engages the offset 59, the electrical circuit is closed, and the function of forming the circuit will be hereinafter referred to. The wires 64 and 67 are connected to an electrical supply 68, Fig. 5, and communicate with the electromagnet 69.

The reference character 70 denotes a latch having a beveled face adapted to engage the ears 8 on the locking-plate 7 and prevent the rotation of the shaft 1 of the turnstile. The latch 70 is spring-pressed by means of the coiled spring 71, arranged in the casing 72. The latch 70 is also arranged in the casing 72 and bears at one end against the spring 71 and is cut away at its inner portion to form a shoulder 73, adapted to be engaged by a holding-arm 74, carried by an armature 75, which is pivoted, as at 76, and connected to a return-spring 77. When the circuit is formed in a manner hereinafter described, the magnet 69 is energized, drawing the armature 75 thereto, carrying the holding-arm 74 therewith and from engagement with the latch 70, thereby releasing the latch 70, so that the same can be moved inwardly in the casing 72 against the tension of the spring 71 and permitting the turnstile to rotate, as the ears 8 will then pass the latch 70. When the circuit is broken, the armature 75 is released, and through the action of the spring 77 the holding-arm 74 will be brought in engagement with the shoulder 73 and arrest the inward movement of the latch 70, thereby preventing the turnstile from turning, as the ears 8 on the disk 7 cannot then pass the latch 70.

The chute 36 is provided with a distributing-bar 78. This bar is secured within the chute at the top thereof and projects downwardly and has its lower edge formed with the tops 79, 80, 81, and 81', or, in other words, the lower edge of the distributing-bar 78 is cut away to form the shoulders 79, 80, 81, and 81', which extend one below the other. The discharge end of the chute 36 is divided off by means of a series of pins 82 to form discharge-outlets of different sizes. The pins 82 are arranged to form these outlets of different sizes, respectively, for the dimes, nickels, quarters, half-dollars, and dollars. The dollar-outlet is arranged immediately below the slots 40 or immediately below the outer side of the chute 35. Then is arranged the outlet for the half-dollars, then the quarters, then the nickels, and then the dimes. The shoulders of the distributing-bar 78 are arranged in connection with the pins 82 as follows: The shoulder 79 is substantially in alinement with the pin 82, forming the inner side of the outlet for the nickels, the shoulder 80 is substantially in alinement with the pin 82, forming the inner side of the outlet for the quarters, the shoulder 81 is substantially in alinement with the pin 82, forming the inner side of the outlet for the half-dollars, and the shoulder 81' is substantially in alinement with the pin 82, forming the inner side of the outlet for the dollars.

The function of the shoulders formed on the distributing-bat 78 is as follows: Assuming that a dollar is dropped from the chute 35 into the chute 36, the passage of the dollar from the chute 36 will be arrested by the shoulder 81', and when the plate 47 is released the dollar will be discharged from the chute 36 through the dollar-outlet into the dollar tube or receptacle 34. The manner of distributing the half-dollars, quarters, nickels, and dimes is the same as distributing the dollars—that is to say, the passage of the half-dollars will be interrupted by the shoulder 81 and they will be discharged through their outlet into their respective tube, the passage of the quarters will be interrupted by the shoulder 80 and they will be discharged through their outlet into their respective tube, the passage of the nickels will be interrupted by the shoulder 79 and they will be discharged through their outlet into their respective tube; but the dimes will pass to the inner end of the chute 36, as their diameter is such as not to engage either of the shoulders 79, 80, 81, and 81', and the dimes will then be discharged through their outlet into their respective tube. The outlet for the dollars is arranged above the tube 34, the outlet for the half-dollars above the tube 33, the outlet for the quarters above the tube 32, the outlet for the nickels above the tube 31, and the outlet for the dimes above the tube 30.

The actuating-slide 44 is provided near its rear end on its upper face with a pair of apertured lugs 83, to which is suitably connected one arm of the bell-crank lever 84, the latter pivoted, as at 85, within the casing 28. The upper arm of the bell-crank lever 84 operates in a slotted link 86, carried on the lower end of the push-button 87. The top of the casing 28 is provided with a coin-slot 88, which registers with the entrance-slot 45.

The latch 70, springs 71, arm 74, armature 76, magnet 69 and its connections, disk 7, and ears 8 are termed the "locking" and "releasing" mechanism for the turnstile.

The disk 10, throwing-arm 11, pin 12, and spring 13 are termed the "automatic throwing mechanism" for imparting a complete movement to the turnstile when released. If the necessary movement thereof is retarded—that is to say, if the requisite movement is not imparted to the turnstile by the passage of a person through the passage or entrance way 15.

The operation of the coin receiving and separating mechanism, the releasing and locking mechanism for the turnstile, and the automatic throwing mechanism for the turnstile is as follows: As a person approaches the turnstile and enters the passage-way 15 he inserts a coin in the slot 88 and then presses downwardly the button 87. When the coin is placed in the slot 88, it passes into the upper chute 35, and its movement is arrested by the offset 55 of the holding-lever 53. The offset 55 extends through the slot 38, consequently arresting the movement of the passage of the coin down the chute 35. When the button 87 is depressed, the angle-lever 84 is operated and the slide 44 moved forwardly, carrying the trip-lever 42 therewith. On the forward movement of the trip-lever 42 the stud 50 engages the holding-lever 53, rocks the same, and withdraws the offset 55 from the slot 38, so that the coin will be permitted to pass down the chute 35. On the forward movement of the trip-lever 42 the holding-arm 56 is carried therewith, and the offsets 58 59 are moved into the slots 40 and arrests further movement of the coin, the coin then being in the chute 35 at the slot 39, the offsets 58 59 holding the coin so that it can be engaged by a feeling or controlling finger, hereinafter described, which regulates the operation of the change-making mechanism, to be also hereinafter described. On the forward movement of the lever 42 the lug 51 engages in the teeth of the rack-bar 61 and holds the lever 42 in its forward position until the lever 62 is rocked in a manner, as hereinafter described, so as to release the lug 51 from engagement with the rack-bar 61. The latter is retained normally in an elevated position by means of the spring 61', connected at one end thereto and at its upper end to the plate 41. When the coin has passed down the chute 35 and is supported by the offsets 58 59, the coin causes the spring 65 to contact with the offset 59, closing the electrical circuit energizing the magnet 69, which draws the armature 76 thereto, carrying the arm 74 therewith and permitting of the release of the latch 70, owing to the fact that when the turnstile is revolved the latch 70 can be moved rearwardly so the beveled edges 9 of the ears 8 can pass the latch 70, for the reason, as before stated, that the latch 70 is released from its locking engagement with the arm 74 as the latter is moved out of the path of the latch. When the trip-lever 42 is returned to its normal position by the releasing of the stud 51 from engagement with the rack-bar 61 in a manner as hereinafter described, the offsets 58 59 are moved rearwardly, so that the coin will then pass into the chute 36. The manner of distributing the coin in the chute 36 has been hereinbefore set forth. When the offsets 58 59 are moved rearwardly and the coin released from its engagement with the contact-spring 65, the contact-spring 65 resumes its normal position—that is, out of engagement with the offset 59—opening the electrical circuit, and owing to the action of the spring 77 the armature 76 will be moved from contact with the magnet 69, carrying the arm 74 therewith and moving it in the casing 72, so it will be back of the shoulder 73 of the latch 70 and prevent movement of the latch, or, in other words, the arm being then in the path of the latch 70 the turnstile will be locked from movement.

The disk 10, carried by the shaft 1, is square, so that the arm 11 and spring 13, which is normally in engagement with the disk, will always tend to throw the same forward, so that if the necessary stroke for rotation is not imparted to the turnstile the arm 11 and spring 13 will come into play and force the disk 10 around until it assumes the position shown in Fig. 6 and impart the necessary movement to the turnstile.

The coins when passed into the chute 36 are not discharged therefrom until the next operation of the trip-lever 42, or, in other words, when a coin is held by the offsets 58 59 in the chute 35 the plate 47 for the discharge end of the chute 36 is released, for the reason that the hooked end 46 of the trip-lever 42 is moved out of engagement therewith; but when the trip-lever 42 is moved to its normal position the plate 47 is closed. Therefore when the lever 42 is moved to its normal position the offsets 58 59 are moved out of the opening 40 and the coin dropped into the chute 36, and its movement is arrested by the plate 47; but when the coin receiving and separating mechanism is operated again the coin will be discharged from the chute 36 into its proper tube or receptacle in a manner as hereinbefore set forth.

Communicating with the bottom of the coin tubes or receptacles 30 to 34, inclusive, is a change-receiving pan 89, terminating at one side in the change-delivering chute 90. This chute projects through the casing 28 at the front thereof and extends above the top of the support 16.

The change-controlling mechanism for controlling the amount of change delivered is constructed as follows: The reference character 91 denotes what may be termed a "change-controlling feeling-finger," which is adapted to project through the opening or slot 39 in the chute 35 and to engage with the edge of the coin supported by the offsets 58 59 when they extend through the slots 40. The diameter of the coin regulates the downward movement of the finger 91, this regulation of the downward movement of the finger 91 forming a function to be hereinafter referred to. The finger 91 is mounted upon the sleeve 92, the latter being loosely mounted upon a shaft 93, suitably secured in the casing 28. The shaft 93 also carries a sleeve 94, upon which is mounted a pinion 95, provided on one side with a stop-pin 96 and on its opposite side with a stud 97, adapted when the pinion 95 is rotated to engage the rocking arm 62, Fig. 8, for operating said arm 62 to permit of the releasing of the trip-lever 42, Fig. 5, and which returns the coin receiving and separating mechanism to its normal position.

The reference character 98 denotes a rock-shaft, which is mounted within the casing 28 and has fixed thereto the forward end of the rocking frame 99, while one side of the rear of said frame 99 is pivoted, as at 100, to the rack-bar 27. The rocking frame 99 is provided with a pair of upwardly and forwardly projecting arms 101, the function of which will be hereinafter referred to.

The sleeve 94 has fixed to it a plate or cam 102, having its upper edge cut away, as at 103, and upon which operates the pin 104, carried by a radial sliding plate 105, which is slotted to receive guide-pins 106 107. The slot of the plate 105 is indicated by the reference character 108. The guide-pins 106 107 are connected with the guide-plate 109, and these guide-pins connect the guide-plate 109 with the radial arm 110, projecting from the sleeve 92, and between the guide-plate 109 and arm 110 is arranged the plate 105. The finger 91 is connected to the plate 105 by the rod 111. On one end of the plate 105 is provided the tooth or dog 112, which is adapted to engage in a curved ratchet-bar 113, arranged in the casing 28 and supported from the bracket 114, as at 115. The center of the ratchet-bar 113 is in the axis of the shaft 93. On the sleeve 94 is an eccentric or cam 116, which when the plate 105 is caused to slide rearwardly (which it does when the finger 91 is stopped by coming against a coin in the chute 35) will bring its tooth 112 into engagement with the curved ratchet-bar 113 to prevent the return of said plate 105.

When the rocking frame 99 is raised by the operation of the turnstile, the movement of the turnstile imparting motion to the gear 20, as well as the gear 23, which meshes with the gear 24, will impart a vertical movement to the bar 27, carrying the frame 99 therewith. The pinion 95 is then rotated by the teeth of the rack-bar 27, and said movement of the pinion 95 will carry the plate or cam 102 therewith, which in turn carries the pin 104 of the radially-sliding plate 105 and also the radial arm 110. These parts moving together and through the intervention of the rod 111 likewise turn the finger 91. The finger 91 thus moves down the slot 39 in the chute 35 until the edge of said finger rests on the edge of the coin supported by the offsets 59 and 60. When the finger 91 engages the edge of the coin, the latter prevents it moving farther, and thus arrests its motion. The movement of the other parts, however, continues and causes first the rod 111 to push longitudinally rearward the plate 105, thus bringing the tooth or dog 112 into engagement with the ratchet-bar 113 at some position higher or lower, according to the diameter of the coin which stops the finger 91. This longitudinally-rearward movement of the plate 105 causes the pin 104 to be shifted out of engagement with the plate or cam 102 and permits the latter to move past the pin 104, thus permitting the pinion 95 to continue its movement while the other parts remain stationary and to cause the stud 97 to engage and rock the arm 62. The longitudinally-sliding plate 105 is locked in its rearward position of engagement with the ratchet-bar 113, first, by the exterior edge of the plate or cam 102 coming behind the pin 104, and, secondly, by the eccentric or cam 116 moving around behind the heel of the plate 105, as before stated. The rocking frame 99 is therefore able to perform a full stroke regardless of the position in which the finger is stopped by the coin.

To the radial arm 110 is attached the rod 117, which is connected to the rocking frame 118 for causing the operation of the coin-ejectors. The rocking frame 118 is fixed to a rock-shaft 119, suitably supported in the casing 28, and has also connected thereto a return-spring 120, suitably secured at one end of the rocking frame 118 and at its other end to the back wall of the casing 28, as at 121. The spring 120 returns the rocking frame 118 to its normal inoperative position. The lower end of the frame 118 carries a transverse member 122, which is adapted to engage with the change-ejectors, to be hereinafter described, and operate them when the rocking frame 118 is moved forwardly.

It will be obvious from the construction hereinbefore set forth that the height to which the transverse member 122 is raised will depend upon the distance to which the feeling-finger 91 has been moved before being arrested by the coin. It will also be evident that on the forward movement of the arms 101 that they will engage the transverse member 122 and move the latter forward to engage the coin-ejectors, to be hereinafter described, and discharge the coins from the tubes or receptacles in the manner hereinafter described.

The arms 101 have connected thereto a yoke 123, which is adapted to engage the coin-ejectors, to be hereinafter described, and return them to their normal position. The yoke 123 is adapted to project through and extend along the lower face of the plate 29. The slots 124 are formed in the said plate 29 for this purpose. (See Fig. 14.)

The change-ejecting mechanism is supported upon the plate 29 below the coin tubes and receptacles and is constructed as follows: The plate 29 forms a part of said ejecting mechanism and at the front thereof below the coin tubes or receptacles 30, 31, 32, and 33 is suitably cut away in a semicylindrical manner, as indicated by the reference characters 125, 126, 127, and 128. Slidably mounted upon the plate 29 and adapted to operate toward the cut-away portion 128 is the ejector 129 for the half-dollars. Slidably mounted upon the plate 29 and adapted to operate toward the cut-away portion 127 is the ejector 130 for the quarters. Slidably mounted upon the plate 29 and adapted to operate toward the cut-away portion 126 is the ejector 131 for the nickels. Slidably mounted upon the plate 29 and adapted to operate toward the cut-away portion 125 is the ejector 132 for the dimes, which is twice the thickness of the other ejectors and is always adapted to eject two dimes, while the ejectors 129, 130, and 131 discharge a single coin—that is to say, one stroke of the ejector 129 discharges a single half-dollar, one stroke of the ejector 130 discharges a single quarter, one stroke of the ejector 131 discharges a single nickel, and one stroke of the ejector 132 discharges two dimes. The plate 29 below each of the ejectors 129, 130, 131, and 132 is provided with a slot, as indicated at 133, Fig. 1. Each of the ejectors is provided with a depending stud 134, which extends through its respective slot 133 and is adapted to be engaged by the yoke 123, Fig. 1, for returning the ejectors to their normal position. The yoke 123 is supported by and slides upon the bracket 135, arranged below the plate 29, Fig. 1.

The upper face of the ejector 129 is provided with a vertically-extending pin 136. The upper face of the ejector 130 is provided with a vertically-extending pin 137, which is of greater height than the pin 136. The upper face of the ejector 131 is provided with a vertically-extending inverted-L-shaped pin 138, which is of greater height than the pin 137. The upper face of the ejector 132 is provided with a vertically-extending pin 129, which is of greater height than the pin 137, but not as high as the pin 138.

The operation of the change-ejecting mechanism is controlled by the diameter of the coin placed in the chute 35. The diameter of the coin, as before set forth, regulates the height of the transverse member 122, so that on its forward movement, which is caused by the operation of the frame 99 and the engagement with the member 122 by the arm 101 of the frame 99, the said member 122 will engage certain of the pins 136, 137, 138, and 139. The pins which the member 122 will engage will cause their respective ejectors to move forward and discharge from the coin tubes or receptacles the necessary change, the change being discharged into the coin-pan 89 and then delivered from the machine through the coin-chute 90. The construction hereinbefore set forth is designed for the payment of but one admission and for delivering the necessary amount of change between the price of admission and the value of the coin inserted into the machine if the latter be greater in value than the former. As the operation of the coin receiving and delivery mechanism has been referred to, it is unnecessary to describe the same again; but it will be stated that while the coin is held in the chute 35 and the turnstile released in the manner hereinbefore set forth the feeling-finger will engage the edge of the coin and the movement of the feeling-finger will be regulated by the diameter of coin in the manner as hereinbefore set forth, therefore regulating the height of the transverse member 122.

It will be assumed for the purpose of illustration that the admission is five cents and that a half-dollar has been inserted in the machine. The vertical movement of the transverse member 122 will be so regulated that the said member 122 on its forward movement will engage with the pin 137 and the pin 139, thereby moving forwardly the ejectors 130 and 132 and discharging into the coin-pan 89 a quarter and two dimes, making forty-five cents change. The transverse member 122 on its forward movement will always ride below the longitudinally-extending member of the L-shaped pin and not engage with the said pin to move the ejector 131 unless a dime is inserted in the machine. If a dime is inserted in the machine, the diameter of the dime is such that the movement of the feeling-finger will be so regulated as to cause the transverse member 122 to assume such an elevated position that on its forward movement it will engage the longitudinally-extending portion of the L-shaped pin and move the ejector 131 forwardly, discharging a nickel, which would be the correct change. The height of the transverse member 122 during the operation of ejecting a nickel will be such that it will ride over the pins 136, 137, and 139. If a dollar is tendered in payment of an admission, the height of the transverse member will be regulated so that it will engage on its forward movement the pins 136, 137, and 139 and operate the ejectors 129, 130, and 132, thereby discharging from the coin tubes or receptacles a half-dollar, a quarter, and two dimes, making ninety-five cents change. As before stated, the transverse member will never engage the pin 138 unless a dime is tendered in payment for admission. Simultaneously with the operation of the controlling feeling-finger 91 and its mechanism, which is termed the "regulating and operating mechanism" for the change-ejecting mechanism, this locking and releasing mechanism for the turnstile will be operated so by the time a person passes through the entrance-way 15 the necessary change will be delivered to him through the coin-delivery chute 90. When a nickel is tendered in payment for admission, which is the necessary sum, the diameter of the nickel is such that the height of the transverse member 122 will be so regulated as not to engage any of the pins 136, 137, 138, and 139. Consequently the ejectors will not be operated.

The rock-shaft 98 is provided with a crank-arm 140 which engages and operates a suitable registering mechanism 141 of any preferred form and which is suitably arranged within the casing 28.

The coin receiving and delivery mechanism is provided with a suitable detecting mechanism 142 for throwing out spurious coins before they are engaged by the feeling-finger and for the return of the mechanism to its normal position after the ejecting of a spurious coin. This mechanism may be of any preferred form. The chute 35 has communicating therewith a chute 143 to receive and discharge from the machine these spurious coins.

The construction hereinbefore described is used to permit of the payment of a single admission and the passage of a single person and for delivering the change between the cost of admission and the amount of cash tendered if the cash tendered is of greater value than the cost of admission.

Figs. 16 to 30, inclusive, of the drawings show a construction adapted to permit of the payment of one or more than one admission at one time and to permit the passage of one or more than one person and to deliver the necessary change between the cost of an admission or admissions and the amount of cash tendered if the cash tendered be of greater value than the cost of the admissions, as well as delivering the necessary change between the cost of a single admission and the amount of cash tendered if the cash tendered be of greater value than the cost of admission. The same construction of coin receiving and separating mechanism, the change-delivering mechanism, the coin tubes and receptacles, and change-controlling mechanism is substantially the same as shown in Figs. 1 to 15, the same reference characters being applied thereto, the slight changes being hereinafter noted.

Referring to Figs. 16 to 30 of the drawings, the vertical shaft 1 of the turnstile is provided with the radially-extending arms 3, the ratchet-wheel 5, pawls 6, locking-disk 7, having the ears 8 beveled, as at 9, the square disk 10, engaged by the throwing-arm 11, provided with the pin 12 and carrying the coiled compression-spring 13. These are of the same construction as employed in Figs. 1 to 15, the same reference characters being applied thereto. The ratchet-wheel 5, pawls 6, locking-disk 7, with its ears 8 beveled, as at 9, the square disk 10, engaged by the throwing-arm 11, the latter provided with the pin 12 and carrying the coiled compression-spring 13, may be arranged above the radial arms 3, or any other suitable mechanism or arrangement of parts may be employed for locking and releasing mechanism for the turnstile, as well as any suitable form of turnstile. Adapted to engage with the ears 8 of the locking-disk 7 is a latch 144, which is provided with a shoulder 145 and engaged and held in its locking position by means of the electrically-operated releasing mechanism, as hereinbefore described in connection with Figs. 1 to 15. This electrically-operated locking mechanism is set forth in Fig. 5, and it is thought unnecessary to refer to the same again. The latch 144 has connected thereto a rod 146, which is pivoted, as at 147, to the link 148, the latter in turn being pivoted, as at 149, to a bar 150, fixed at one end, as at 151, to a vertically-extending rock-shaft 152. The bar 150 has connected thereto, as at 153, one end of a coiled spring 154, while the other end of the coiled spring 154 is fixed within the support or casing 16. The spring 154 is adapted to rock the shaft 152 when the shaft 1 is released. The upper end of the shaft 152 carries an arm 155, which is fixed to the shaft 152, as at 156, and on its free end carries a pin 157, which is connected to a slide-bar 158, operating in a guideway 159, formed by the channel-bar 160, which is slotted to permit of the operation of the pin 157. The guide-bar 158 has pivotally connected thereto, as at 161, one end of a pawl 162. One side of the pawl 162 is beveled, as at 163, and the other side is provided with a lug 164. The pawl 162 is termed a "controlling" means for controlling the movement of the turnstile, and the operation of the pawl 162 and its connections as hereinbefore described will be hereinafter referred to. The vertical shaft 1 in this construction extends within a casing 165 and carries a beveled-face gear 19, which is adapted to engage and operate the gear-wheel 20, carried by the sleeve 21, mounted upon the shaft 22, these parts being of the same construction as hereinbefore referred to, the same reference characters being applied thereto. The shaft 22 is supported in any suitable manner within the casing 165, and the sleeve 21 carried thereby is also provided with the beveled gear 23, meshing with and operating the beveled gear 24, which is provided with a crank 25 of the same construction as hereinbefore referred to, the same reference characters being applied thereto. The shaft 22 carries at one end a gear-wheel 166, meshing with a gear-wheel 167 of the same diameter. The latter is mounted upon the operating worm-shaft 168, suitably supported in the bearing 169. The worm-shaft 168 at each end carries an eccentric 170 for operating the pivoted trip-lever arms 171, supported from the bearing 169. The function of the trip-arms 171 will be hereinafter referred to.

Secured within the casing 165 and extending longitudinally thereof is a supporting-bar 172, provided with a series of openings 173, 174, 175, 176, and 177. The bar 172 is also adapted to support the channel-bar 160, forming the guideway 159 for the guide-bar 158.

The openings 173 to 177, inclusive, are suitably spaced apart and are adapted to receive the controlling-blocks which regulate the ejectors of the change mechanism, as well as controlling the movement in one direction of the pawl 162. The opening 173 is adapted to receive the controlling-block 178 for a single admission. The opening 174 is adapted to receive the controlling-block 179 for two admissions. The opening 175 is adapted to receive the controlling-block 180 for three admissions. The opening 176 is adapted to receive the controlling-block 181 for four admissions, and the opening 177 is adapted to receive the controlling-block 182 for five admissions. It will be evident that as many controlling-blocks can be employed as desired.

Each of the controlling-blocks is provided with a slot, as at 183, and is further provided at the top edge, near one side thereof, with a recess 184. Through the slots 183 of the controlling-blocks extends a yoke 185, the free ends of which carry a roller 186. This yoke 185 is adapted to return the controlling-blocks to their normal position as the rollers 186 thereof are engaged by the trip-arms 171, so that when the trip-arms 171 are engaged by the eccentrics 170 the trip-arms 171 will rock and elevate the yoke 185, and thereby return the controlling-blocks to their inoperative or elevated position.

The lower end at one side of each of the controlling-blocks is beveled, as at 187, and these beveled ends of the controlling-blocks are adapted to engage the beveled edge 163 of the pawl 162 for a function hereinafter described. The controlling-blocks on their edges adjacent to the edges having the beveled corners are provided with a pair of grooves 188, in which is adapted to engage the spring-pressed retaining-pin 189. These springs are suitably connected to the supporting-bar 172, as at 190. The controlling-blocks are adapted to normally project above the upper face of the bar 172 and are retained in such position by the pins 189 when they engage in the lower groove 188. When the controlling-blocks are lowered to their operative position in the manner hereinafter described they are retained in such position by means of the pin 189 engaging in the upper groove 188.

Extending across the top of the controlling-blocks is a series of regulating-bars 191, 192, 193, and 194. These regulating-bars are loosely or pivotally mounted, as at 195, upon the shaft 196, suitably secured within the casing 165. The forward end of the regulating-bar 191 is bent sidewise at an inclination, as at 197, and then bent in a longitudinal manner and bifurcated or formed into a fork, as at 198. The forward end of the regulating-bar 192 is bent sidewise slightly at an inclination, as at 199, and then bent in a longitudinal manner and bifurcated or formed into a fork, as at 200. The forward end of the bar 193 is bent sidewise slightly at an inclination, as at 201; but the inclined portion thereof extends in an opposite direction to that of the inclined portion 199 of the member 192. The inclined portion 201 of the bar 193 terminates in a longitudinally-extending bifurcated or forked portion 202. The forward portion of the bar 194 is bent sidewise at an inclination, as at 203, in the same direction as the inclined portion 201 of the bar 193, and the inclined portion 203 of the bar 194 terminates in the longitudinally-extending portion 204, which is bifurcated or formed into a fork. It may be well to state that the bars 191, 192, 193, and 194 extend longitudinally and parallel with one another and, as before stated, are arranged above the top of the controlling-blocks 178, 179, 180, 181, and 182 and normally held out of engagement with the said blocks by a series of return-springs 194[a] or having their rear weighted.

The controlling-block 178 carries an upwardly-extending lowering-arm 205 for the regulating-bar 191. The lowering-arm 205 is constructed of a vertical portion, a transversely-extending portion, and a depending portion, the depending portion being of such length and width as to engage only the member 191, so that when the controlling-block 178 is lowered the depending portion of the lowering-arm 205 will only engage the regulating-bar 191 and rock or lower it. The controlling-block 179 carries the lowering-arm 206 for the regulating-bars 192 and 194. The lower arm 206 is so constructed that when the controlling-block 179 is lowered the arm 206 will only engage the regulating-bars 192 and 194 and rock or lower them. The controlling-block 180 carries the lowering-arm 207 for the regulating-bars 191, 192, and 193. The lowering-arm 207 is so constructed as to only engage the regulating-bars 191, 192, and 193 to lower them or rock them when the controlling-block 180 is lowered. The controlling-block 181 carries a lowering-arm 208 for the regulating-bars 193 and 194. The lowering-arm 208 is so constructed as to only engage the regulating-bars 193 and 194 to lower them or rock them when the controlling-block 181 is lowered. The controlling-block 182 carries the lowering-arm 209 for the regulating-bars 191, 192, 193, and 194. The lowering-arm 209 is so constructed that it will engage and lower all of the regulating-bars when the controlling-block 182 is lowered. It would be well to state that the lowering-arms 206 to 209, inclusive, are suitably connected to the controlling-blocks and project over the regulating-bars 191 to 194, inclusive, so as to suitably engage the top edge of the said bars and lower or rock them for the function to be hereinafter referred to.

The normal position of the pawl 162 is that as shown in Fig. 27, with its stud or lug 164 engaging the spiral of the operating worm-shaft 168 at one end thereof and lying upon the guide-bar 158. The pawl 162 is retained upon the guide-bar 158 by means of a spring-pressed pin 210, carried by the guide-bar 158, Fig. 29, and this pin 210 is adapted to engage in one of the recesses 211 212, formed in the lower face of the pawl 162, Figs. 28 and 29. The pawl 162 is removed from its engagement with the spiral, as shown in Fig. 27, by means of the operation of a tilting plate 213, which is fixed on a rock-shaft 214, suspended from the bar 172, as at 215, Fig. 26. The plate 213 is adapted to extend below the controlling-blocks 178 to 186, inclusive, at one side thereof, so that when any of the controlling-blocks are lowered they will come in contact with the plate 213, carrying the same therewith and rocking the shaft 214. This rocking of the shaft 214 will carry therewith the depending arm 216, which has its lower end connected to the pulling-bar 217. The latter is provided with a hooked end 218 and a depending pin 219. The hooked end 218 of the pulling-bar 217 is adapted to lie at one side at one end of the pawl 162, Fig. 27, so that when the shaft 214 is rocked by means of the operation of the plate 213 the pulling-bar 217 will be carried therewith in a transverse manner and move the pawl 162 from its engagement with the spiral of the worm-shaft 168. The movement of the pawl 162 by the hooked end 218 of the pulling-bar 217 is such that when the pulling-bar is operated and moves the pawl 162 the pin 210 will ride out of the recess 211 and the hooked end 218 of the pulling-bar will be drawn free of the end of the pawl 162. At this time the pin 210 will engage in the recess 212. The pawl 162 will then be set at an inclination upon the guide-bar 158. The pawl 162 will be retained in such position until the beveled side 163 thereof will engage with the beveled corner of the lowered controlling-block and move the pawl 162 back on the guide-bar 158, so that the pin 210 will engage in the recess 211 and hold the pawl 162 in such position so that its stud 164 will engage the spiral of the worm 168, and it will be obvious that as the worm 168 rotates the pawl 162 and guide-bar 158 will be returned to their normal position, as shown in Fig. 27.

The pin 219 of the pulling-bar 217 has connected thereto a spring 220, so that the pulling-bar 217 after the controlling-block has been elevated will be caused to return to its normal position, as shown in Fig. 27. When the pulling-bar 217 returns to its normal position, it will also return the plate 213 to its normal position, as shown in Fig. 26, for the reason that the pulling-bar 217, arm 216, shaft 214, and plate 213 are bodily movable.

Arranged within the casing 165 is a series of push-rods, (numbered, respectively, 221, 222, 223, 224, and 225.) The rod 221 at its lower end is adapted to extend in the recess 184 of the controlling-block 178, the rod 222 at its lower end is adapted to extend in the recess 184 of the controlling-block 179, the rod 223 at its lower end is adapted to extend in the recess 184 of the controlling-block 180, the rod 224 at its lower end is adapted to extend in the recess 184 of the controlling-block 181, and the rod 225 at its lower end is adapted to extend in the recess 184 of the controlling-block 182. These push-rods are adapted when operated to lower the controlling-blocks. The upper end of the push-rod 221 carries a push-button 226 to be used for one admission, the upper end of the push-rod 222 carries a push-button 227 to be used for two admissions, the upper end of the push-rod 223 carries a push-button 228 to be used for three admissions, the upper end of the push-rod 224 carries a push-button 229 to be used for four admissions, and the upper end of the push-rod 225 carries a push-button 230 to be used for five admissions. Each of these push-buttons when in its normal position projects partly above the top of the casing 165 and is arranged to operate in an opening 331, formed in the top of the casing. It will be evident that as many push rods and buttons will be employed as there are controlling-blocks.

The reference character 232 denotes a bell-crank lever which is pivoted at 233 within the casing 165, and the upper arm thereof extends through the push-rod 221. The reference character 234 denotes a bell-crank lever which is pivoted in the casing 165, as at 235, and the upper arm thereof extends in the push-rod 222. The reference character 236 denotes a bell-crank lever which is pivoted in the casing 165, as at 237, and the upper arm thereof extends in the push-rod 223. The reference character 238 denotes a bell-crank lever pivoted in the casing 165, as at 239, and the upper arm thereof extends in the push-rod 224. The reference character 238$^a$ denotes a bell-crank lever pivoted in the casing 165, as at 239$^a$, and the upper arm thereof extends in the push-rod 225. These bell-crank levers are pivoted within the casing 165 near the top thereof. Mounted within the casing 165 below the bell-crank levers is an operating-bar 240 for the cash receiving and separating mechanism. This bar is supported in the bracket 241 and in a bracket 242, depending from the plate 41 of the cash receiving and separating mechanism. The rear end of the bar 240 carries a coiled spring 243. The bar 240 operates in a forward manner, and the spring 243 is adapted to return the bar to its normal position. The forward end of the bar 240 is provided with a slot 244, in which engages the pin 245, carried by the trip-lever 42 of the cash receiving and separating mechanism. The bar 240 is connected to the trip-lever 42 by this pin-and-slot connection.

It may be well to state that in the construction shown in Figs. 16 to 30 the connection between the cash-receiving mechanism and the push-buttons is different from that shown in Figs. 1 to 15. In Figs. 1 to 15 the slide 44 is connected to the single push-button, whereas in the construction shown in Figs. 16 to 30 the trip-lever 42 is connected to the push-rods 221, 222, 223, 224, and 225 by means of the rod 240 in the following manner: The rod 240, Fig. 19, is provided with a series of slots numbered, respectively, 246, 247, 248, 249, and 249$^a$. The slot 246 is adapted to receive the lower arm of the bell-crank lever 232, the slot 247 is adapted to receive the lower arm of the bell-crank lever 234, the slot 248 is adapted to receive the lower arm of the bell-crank lever 236, the slot 249 is adapted to receive the lower arm of the bell-crank lever 238, and the slot 249$^a$ is adapted to receive the lower arm of the bell-crank lever 238ª. The slots 246 to 249ª are of such size that when one push-rod is operated and its corresponding bell-crank the remaining bell-cranks will not be operated—that is to say, the rod 240 will not carry the other bell-cranks therewith when moving forward. Each of the bell-crank levers 232 to 238ª is constructed in such a manner that the upper and lower arms thereof will be out of alinement with one another. (See Fig. 19.)

The change-ejecting mechanism used in connection with the construction shown in Figs. 16 to 30 is constructed differently from that shown in Figs. 1 to 15—that is, that portion of the mechanism comprising the ejectors for discharging the nickels and dimes; but it is thought advisable to describe the entire series of ejectors. The supporting-plate 250 for the ejectors is substantially of the same construction as the supporting-plate 29, hereinbefore referred to in the construction shown by Figs. 1 to 16. Mounted upon the plate 250 is the ejector 251 for the fifty-cent pieces. The ejector 251 is provided upon its upper face with a pin 252 and on its lower face with a lug 253, which projects through a slot in the plate 250. The pin 252 upon the upper face of the ejector 251 is rigid. The pin 252 may be long enough to project above and below the ejector 250, if desired, and the separate lug 253 dispensed with. Mounted upon the plate 250 is an ejector 254 for the twenty-five-cent pieces. The ejector 254 has upon its upper face a pin 255, which is of greater height than the pin 252 of the ejector 251. The ejector 254 has depending from its lower face a lug 256, which projects through a slot in the plate 250. If desired, the pin 255 may be long enough to project above the ejector 254 and below the plate 250, thereby dispensing with the lug 256. Mounted upon the plate 250 is a pair of ejectors 257 258 for the nickels. The ejector 257 is adapted to overlap the ejector 258 at its forward end, and each of these ejectors 257 and 258 has its forward end constructed substantially in the form of a ring, so as to surround the coin. The ejector 257 is provided with a pin 259, which is of greater height than the pin 255 and is pivoted to the studs 260, carried on the upper face of the ejector 257. The ejector 257 has also a depending lug 259', which projects through a slot in the plate 250. Extending through the ejector 257 and the lug 259' and adapted to engage the pin 259 for holding it stationary or in a vertical position is a regulating-pin 261, which has its lower end provided with an L-shaped arm 262, adapted to engage in the bifurcated or forked end 198 of the regulating-bar 191. Mounted upon the ejector 258, a suitable distance from the rear end thereof, is an inverted-L-shaped pin 263, which is pivoted at its lower end to the studs 264, carried by the ejector 258. The ejector 258 has also a depending lug 263', which projects through a slot in the plate 250. Extending through the ejector 258 and lug 263' is a regulating-pin 265, which is adapted to retain the pin 263 in an elevated or stationary position. The pin 265 has its lower end provided with an L-shaped arm 266, which extends in the bifurcated or forked end 200 of the regulating-bar 192. The L-shaped arm 266 extends in an opposite direction to that of the L-shaped arm 262. Mounted upon the plate 250 is a pair of ejectors 267 and 268 for the dimes. The ejector 267 is adapted to overlap the ejector 268 at its forward end, and the forward end of each of the ejectors 267 and 268 are formed substantially ring-shaped, so they will surround the coins. Mounted upon the ejector 267 is a pin 269, which is pivoted to the studs 270. The ejector 267 has also a depending lug 269', which projects through a slot in the plate 250. Extending through the ejector 267 and lug 269' is a regulating-pin 271, which is adapted to retain the pin 269 stationary or in a vertical position. The pin 271 has its lower end provided with an L-shaped arm 272, which projects into the bifurcated or forked end 202 of the regulating-bar 193. Mounted upon the ejector 268 is a pin 273, which is pivoted in the studs 274. The ejector 268 has also a depending lug 273', which projects through a slot in the plate 250. Extending through the ejector 268 and the lug 273' is a regulating-pin 275, which is adapted to engage and retain the pin 273 stationary or in a vertical position. The pin 275 has its lower end provided with an L-shaped arm 276, which extends in the bifurcated or forked end 204 of the regulating-bar 194.

The yoke 123, carried by the arms 101 of the rocking arm 99, is adapted to engage the front of the lugs 253, 256, 259', 263', 269', and 273', so as to return the ejectors to their normal positions in the manner as hereinbefore described in connection with the construction shown in Figs. 1 to 15.

The construction shown in Figs. 16 to 30 is provided with a locking mechanism to prevent a person from operating the turnstile for more admissions than the value of the coin placed in the coin-opening 277—that is to say, if a person should insert a dime in the machine and press the push-button 229, which is used for four admissions, instead of pressing the push-button 226, this locking mechanism is adapted to throw down a controlling-block and prevent the turnstile from operating after two persons have passed through the entrance-way 15. This locking mechanism is controlled entirely by the diameter of the coin. For example, if the person should place a dime in the machine, which would only pay the passage of two persons, the locking mechanism is such as to operate the controlling-blocks for two admissions and permit the turnstile to operate so only two persons can pass through if a push-button for a greater number of admissions has been operated. This locking mechanism consists of a pair of locking-bars 278 and 279. The locking-bar 278 at its lower end is adapted to engage in a recess in the controlling-block 178, and the locking-bar 279 is adapted to engage at its lower end in a recess in the controlling-block 179. These locking-bars 278 279 are operated by means of a finger 280, which is pivoted, as at 281, to a lever 281$^a$. The latter in turn is pivoted, as at 281$^b$, to a bracket 285, extending rearwardly from the chute 35. The lever 281$^a$ is provided with a nose 281$^c$, which is adapted to be engaged by a projection 281$^d$, carried by the trip-lever 42. The lever 281$^a$ has connected thereto a coiled spring 281$^e$ for returning it to its normal position. The forward end of the finger 280 is adapted to operate in an opening formed in the chute 35 and its movement arrested by the edge of the coin inserted in the chute 35, as well as its movement being controlled by the diameter of the coin. The rear end of the finger 280 is adapted to engage with either of the locking-rods 278 and 279 for moving the same downwardly, thereby moving its respective controlling-block and arresting the movement of the pawl 162 in one direction before it reaches the controlling-block for a greater number of admissions than the value of the coin inserted, as well as moving the pawl 162 into engagement with the worm-shaft 168. The rear end of the finger 280 is guided between a series of lugs 282 283 284, carried by the rearward projection or bracket 285. In Fig. 16 the finger 280 is shown as guided between the lugs 283 284 and in engagement with the locking-bar 279, moving the same downwardly, and also the controlling-block 179. The coin inserted is a dime. Consequently it is the controlling-block for two admissions that is lowered. If the coin inserted is a nickel, the rear end of the finger 280 will operate between the lugs 282 and 283 and engage the locking-bar 279 and lower the controlling-block 178. If the coin inserted is of greater diameter than the nickel, the finger would be guided at the front of the lug 282, and therefore not engage with either of the locking-bars 278 279. It will be evident that when the trip-lever 42 is operated by the rod 240 the projection 281$^d$ will engage with the nose of the lever 281$^a$ and carry the same forward with the trip-lever 42, as well as the finger 280, consequently imparting the necessary operation to the finger 280. The finger 280 is also adapted to engage a suitable means for lowering the bar 61' to release the trip-lever 42 and return the push-rods to their normal positions when the push-rods are operated when no coin is inserted in the apparatus. Other means than that operated by the finger 280 for such purpose can be employed. The coin receiving and separating mechanism can be provided at its entrance-slot with a suitable means to prevent the insertion of a coin after a coin has been placed therein and before the machine has been operated for the first coin inserted.

In the construction shown in Figs. 16 to 30 it may be well to state that the rotation of the worm 168 is the same as the shaft 22—that is, it revolves four times to one revolution of the face-gear 19. If the pawl 162 has been set for one admission, one revolution of the worm 169 will return the pawl to its normal position, thereby preventing more than one person passing through the entrance or passage way 15. If the pawl 162 has been set for two admissions, two revolutions of the worm 169 return the pawl to its normal position, thereby preventing more than two persons passing through the entrance or passage way 15. If the pawl 162 has been set for three admissions, three revolutions of the worm 169 will return the pawl to its normal position, thereby preventing more than three persons passing through the entrance or passage way 15. If the pawl 162 has been set for four admissions, four revolutions of the worm 169 will return the pawl to its normal position, thereby preventing more than four persons passing through the entrance or passage way 15. If the pawl 162 has been set for five admissions, five revolutions of the worm 169 will return the pawl to its normal position, thereby preventing more than five persons passing through the entrance or passage way 15. This operation can be extended indefinitely by increasing the number of spirals forming the worm 169 and also increasing the number of controlling-blocks and push-rods correspondingly.

The operation of the worm, as well as the turnstile, is controlled by the controlling-blocks, pawl 162, as well as the shaft 152.

The operation of the device, as shown in Figs. 16 to 30, is as follows: For example, it will be assumed that a dime has been placed in the coin-opening 277 for the purpose of paying two admissions. The dime in its movement down the chute 35 will be arrested by the offset 55 in a manner as hereinbefore set forth in connection with the operation of the coin receiving and separating mechanism. The push-button 227 is then lowered, rocking the bell-crank 234, which movement carries forwardly the operating-bar 240. The latter in turn moves the trip-lever 42, which carries the actuating-slide 44 therewith and closes the entrance-opening 45 of the cash receiving and separating mechanism. The latter is then operated in the manner as hereinbefore described in connection with the construction set forth in Figs. 1 to 15, and it is thought unnecessary to refer to the operation of this mechanism again. The locking mechanism for the shaft 1 is also released in a manner as hereinbefore set forth, so that the turnstile can operate. It will be assumed that the position of the pawl 162 is that as shown in Fig. 27. Simultaneously with the depression of the push-button 227 the push-rod 222 is lowered, which in turn lowers the controlling-block 179. When the locking mechanism is released, so that the turnstile can operate, the action of the spring 154 will rock the shaft 152 and carry the guide-bar 158 along the guideway 159, the guide-bar 158 carrying the pawl 162 therewith. When the controlling-block 179 is lowered, it will engage the plate 213 and rock the shaft 214, thereby causing the pulling-bar 217 to move the pawl 162 out of engagement with the spiral of the worm-shaft 168. This will permit the guide-bar 158 being moved along the guideway 159 by the arm 155, carried by the shaft 152. The position of the pawl 162 will then be at an inclination upon the guide-bar 158, and the pin 210 will engage in the recess 212, thereby holding the pawl 162 at an inclination. The controlling-block 179 having been lowered in the manner as just described, it will be in the path of the pawl 162, so that when the pawl 162 travels rearwardly, owing to the operation of the shaft 152, in a manner as set forth, the beveled edge 163 of the pawl will be engaged by the beveled corner 187 of the controlling-block, which will restore the pawl 162 to its normal position upon the guide-bar 158 and so that the pin 210 will engage in the recess 211 and hold the pawl 162. The stud or nose of the pawl 162 will then be brought against the spiral of the worm 168, and as the worm-shaft 168 is rotating it will be evident that the pawl 162 will be brought to its normal position, as shown in Fig. 27, thereby permitting of the rotation of the turnstile until the pawl 162 is brought to its normal position, as just set forth. The return movement of the pawl 162 will cause the shaft 152 to assume its normal position, and the latch 144 will have its shoulder engaged by the holding-arm 74 of the locking mechanism, or, in other words, the arm 74 will be moved in the path of the latch 144, consequently locking the turnstile. The operation of the turnstile in this particular will be such that only two persons can pass through the entrance-way. After the second person has passed the pawl 162 will be in the position as shown in Fig. 27, and the holding-arm 74 will engage the latch 144 and prevent the inclined edge of the ears of the disk 7 from riding past the latch, thereby locking the shaft 1 from movement. The operation in connection with three, four, or five admissions is the same as that in connection with two or a single admission, the controlling-blocks regulating or stopping the rearward travel of the pawl 162 and causing it to engage with the worm 168, so that as the worm rotates it will carry the pawl 162 back to its normal position, as well as restoring the shaft 152 to its normal position, so that through the intervention of the bar 150, link 148, and rod 146 the latch 144 will be moved so it can be engaged by the locking mechanism, or, in other words, the holding-arm 74. The controlling-block 179 is held in its lower position by the spring-pressed pin 189 and returned to its normal or closing position by means of the eccentric 170 operating the trip-arms 171, which in turn will elevate the yoke 185, the latter carrying the controlling-blocks therewith.

The operation of the controlling mechanism for the change-ejecting mechanism is the same as that hereinbefore set forth in connection with the construction shown in Figs. 1 to 15. The same controlling mechanism is employed, and which is also provided with a feeling-finger $91^a$, Fig. 18. The difference between the construction of the feeling-finger $91^a$ and that of the feeling-finger 91 is that the feeling-finger $91^a$ is provided with a notch $91^b$, in which is adapted to engage the nickels, so that the transverse member 122 will ride above the pins 252 255 259 269 273 and over the L-shaped pin 263, consequently not ejecting any cash or coins from the coin tubes or receptacles. In the construction shown in Figs. 16 to 30 the coin tubes or receptacles are of the construction as that shown in Figs. 1 to 15, as is the cash-receiving pan 89 and the cash-delivery chute 90.

The operation of the ejecting mechanism as used in connection with Figs. 16 to 30 is as follows: If a dime is placed in the machine for the payment of two admissions and the controlling-block 179 is lowered, the arm 206 will engage and lower the regulating-bars 192 194, consequently lowering the regulating-pins 265 and 275, and on the forward movement of the transverse member 122 the same will ride over the pins 252, 255, 259, 269, and 273 and engage the longitudinally-extending arm of the pin 263 and knock over said pin. Therefore the ejectors will not be carried therewith and no money or coins discharged from the receptacle. The height of the transverse member 122 when a dime is inserted in the machine is such that it will engage the pin 263, but as the regulating-pin 265 has been lowered, owing to the rocking of the regulating-bar 192, the transverse member 122 will knock down the pin 263, and consequently not move the ejector 258. It is not essential when a dime is placed in the machine to lower the regulating-pin 275; but this pin should be lowered when the controlling-block 179 is lowered, for the reason that sometimes twenty-five cents will be inserted in payment of two fares, and consequently the pin 273 will have to be knocked down by the transverse member 122, as it is only necessary to have one dime ejected as change for the quarter when two admissions are to be paid for. If a quarter should be placed in the machine for payment of two admissions, the controlling-block 179 is lowered in a manner as hereinbefore set forth, as well as the regulating-bars 192 and 194 through the action of the arm 206, which will also cause the regulating-pins 264 and 275 to be lowered as they are engaged by the bifurcated or forked ends of the bars 192 and 194, so that on the forward movement of the transverse member 122 the same will engage the pins 259 and 269 and eject from the coin tubes or receptacles a dime and a nickel; but the transverse member will ride under the longitudinally-extending arm of the pin 263 and will engage the pin 273 and knock it over, the height of the transverse member 122 being controlled by the diameter of the coin. If a dollar is tendered in payment of two admissions, the vertical movement of the transverse member 122 will be so regulated that it will engage the pin 252, the pin 255, pin 259, and the pin 269 and move their ejectors, so that ninety cents will be discharged from the coin tubes or receptacles—that is, a half-dollar, a quarter, a nickel, and a dime. The transverse member will ride under the L-shaped pin 263 and knock down on its forward movement the pin 273, consequently not operating the ejectors 258 and 268. If a half-dollar is tendered in payment of five admissions, the arm 209 will rock all of the regulating-bars, so that the regulating-pins 261, 265, 271, and 275 will be lowered and the height of the transverse bar 123 so regulated as to pass over the pin 252 and knock down the pins 259 263 269 273 and engage the pin 255 and operate the ejector 254, thereby discharging twenty-five cents from the machine. If a half-dollar is tendered in payment of four admissions, the arm 208 will engage and rock the regulating-bars 193 and 194, thereby lowering the pins 271 and 275, and the height of the transverse member will be so regulated as to ride over the pin 252 and knock down the pins 269 and 273, but will engage the pin 259 and the pin 255 and eject from the machine a nickel and a quarter. The operation of the device for the payment of the other fares can be readily understood in view of the foregoing description.

It is thought the many advantages of a cash-receiving and change-giving apparatus for turnstiles can be readily understood from the foregoing description, taken in connection with the accompanying drawings, particularly in view of the fact that the machine is adapted for receiving the cost of an admission and for automatically ejecting or discharging therefrom the amount of change between the value of the money inserted in payment for the admission and the cost of the admission when the value of the money inserted is greater than the cost of admission, for receiving at one time the cost of more than one admission and for automatically ejecting or discharging the amount of change between the value of the money inserted in payment of several admissions and the cost of the several admissions, for automatically storing the money tendered for the admissions according to its value, and it will furthermore be evident that changes, variations, and modifications can be resorted to without departing from the spirit of the invention or sacrificing any of the advantages of the invention, and I therefore do not wish to restrict myself to the details of construction hereinbefore described and as shown in the accompanying drawings, but reserve the right to make such changes, variations, and modifications as come properly within the scope of the protection prayed.

Having fully described my invention, what I claim as new, and desire to secure by Letters Patent, is—

1. An apparatus of the character described comprising a cash receiving and separating mechanism provided with a holding-arm having a pair of offsets, one of which is insulated from the other.

2. An apparatus of the character described comprising a cash receiving and separating mechanism provided with a holding-arm having a pair of offsets, one of which is insulated from the other and provided with a contact-spring.

3. An apparatus of the character described comprising a cash receiving and separating mechanism provided with a holding-arm having a pair of offsets, one of which is insulated from the other and provided with a contact-spring, and a source of electrical energy connected with one of said offsets and said spring.

4. An apparatus of the character described comprising a cash receiving and separating mechanism provided with an elongated trip-lever having a beveled stud and a pivoted rack-bar adapted to be engaged by said stud for retaining said lever in its operative position.

5. An apparatus of the character described comprising a cash receiving and separating mechanism provided with an elongated trip-lever having a beveled stud and a pivoted rack-bar adapted to be engaged by said stud for retaining said lever in its operative position, and means for releasing said rack-bar from engagement with said stud so that the said lever can be returned to its inoperative position.

6. An apparatus of the character described comprising a series of controlling-blocks, each of which is provided with a slot, a beveled corner and a recess in the top thereof.

7. An apparatus of the character described comprising a series of controlling-blocks, each of which is provided with a slot, a beveled corner and a recess in the top thereof, two of the said blocks further provided with an additional recess in the top thereof.

8. An apparatus of the character described comprising a series of controlling-blocks, each of which is provided with a slot, a recess in its top, a bevel lower corner, and a pair of grooves in one side edge thereof.

9. An apparatus of the character described comprising a change-ejecting mechanism, and a series of longitudinally-extending regulating-bars therefor, said bars pivoted at their rear end and having their forward end bifurcated and adapted to suitably engage with the said mechanism.

10. An apparatus of the character described comprising a change-ejecting mechanism, a series of longitudinally-extending regulating-bars therefor, said bars pivoted at their rear end and having their forward end bifurcated and adapted to suitably engage with the said mechanism, and means for suitably operating said bars.

11. An apparatus of the character described comprising a change-ejecting mechanism, and a series of regulating-bars therefor, said bars pivoted at one end and having their other end bifurcated and adapted to suitably engage with said mechanism.

12. An apparatus of the character described comprising a change-ejecting mechanism, a series of regulating-bars therefor, said bars pivoted at one end and having their other end bifurcated and adapted to suitably engage with said mechanism, and means for suitably operating said bars.

13. An apparatus of the character described, comprising a change-ejecting mechanism, and a series of spring-return regulating-bars therefor, said bars pivoted at one end and having their other end bifurcated and suitably engaging with said mechanism.

14. A machine of the character described comprising a series of controlling-blocks, and a lever mechanism for suitably locking and controlling one or more of said blocks.

15. An apparatus of the character described comprising a series of controlling-blocks, one or more locking-rods for locking and controlling one or more of said blocks, and a lever mechanism for suitably operating the said rods.

16. A machine of the character described comprising a series of controlling-blocks, and a lever mechanism controlled by the diameter of a coin for locking and controlling one or more of said blocks.

17. An apparatus of the character described comprising a series of controlling-blocks, one or more vertically-movable rods for locking and controlling one or more of said blocks, and a lever mechanism controlled by the diameter of a coin for suitably operating said rods.

18. In an apparatus of the character described, a cash receiving and separating mechanism, a change-ejecting mechanism, a series of controlling-blocks for said change-ejecting mechanism, operating means for said blocks, and a lever mechanism controlled by the diameter of a coin and adapted when operated to suitably control and lock one or more of said blocks.

19. In an apparatus of the character described, the combination with a change-ejecting mechanism, of a series of forwardly-extending regulating-bars therefor, said bars pivoted at their rear ends and having their forward ends bifurcated, the forward ends of said bars adapted to suitably engage with and regulate the movement of said change-ejecting mechanism, a series of blocks provided with means adapted to engage with and suitably operate the said bars, operating means for said blocks, and a lever mechanism controlled by the diameter of a coin and when operated adapted to suitably lock and control one or more of the said blocks.

20. In a machine of the character described, the combination with a change-ejecting mechanism, of a controlling mechanism therefor, said controlling mechanism comprising a plurality of blocks, each of which is provided with a slot, a beveled corner and a recess in the top thereof, two or more of the said blocks further provided with an additional recess in the top thereof, and each of said blocks further provided with an upwardly-extending lowering-arm.

21. In an apparatus of the character described, the combination with a change-ejecting mechanism, of a vertically-movable controlling and regulating mechanism therefor, means for moving the said controlling mechanism in one direction, causing thereby the regulation and control of said change-ejecting mechanism, and means for moving the said controlling mechanism in an opposite direction thereby returning said mechanism to its normal position.

22. In an apparatus of the character described, the combination with a change-ejecting mechanism, of a series of regulating-bars therefor, said bars pivoted at one end and at their other end bifurcated, and means for automatically returning said bars to their normal position after being operated.

23. In an apparatus of the character described, the combination of a change-ejecting mechanism, means controlled by the diameter of a coin and adapted when operated to engage said mechanism for suitably operating it, means for regulating the movement of the said change-ejecting mechanism, and means having its movement controlled by the diameter of a coin and adapted when operated to suitably lock and control the movement of the regulating means for the change-ejecting mechanism.

24. In a machine of the character described, a cash receiving and separating mechanism provided with a holding-arm having a pair of offsets extending in opposite directions, one of said offsets suitably insulated from the other.

25. In a machine of the character described, a cash receiving and separating mechanism provided with a holding-arm having a pair of offsets extending in opposite directions, one of said offsets suitably insulated from the other and provided with a contact-spring.

26. In an apparatus of the character described, a cash receiving and separating mechanism provided with an elongated trip-lever and a rack-bar, said lever provided with means adapted to engage said bar for retaining the lever in its operative position.

27. In an apparatus of the character described, a cash receiving and separating mechanism provided with a trip-lever, and a rearwardly-extending means adapted to be engaged by the lever for retaining said lever in its operative position.

28. In an apparatus of the character described, a cash receiving and separating mechanism provided with a trip-lever, and a rearwardly-extending means adapted to be engaged by the lever for retaining said lever in its operative position, in combination with means for releasing said lever so it can return to its inoperative position.

29. In an apparatus of the character described, a plurality of vertically-movable controlling-blocks, a plurality of rods for operating said blocks, means independent of said rods for retaining the said blocks in their operative position, and means for retaining the said blocks in their inoperative position.

30. In an apparatus of the character described, a plurality of vertically-movable controlling-blocks, and means engaging with one side of the blocks and adapted to retain them in their operative and inoperative position.

31. In an apparatus of the character described, a change-ejecting mechanism, operating means therefor, a pivoted regulating means for said mechanism, and a vertically-movable controlling means for said regulating means.

32. In an apparatus of the character described, a change-ejecting mechanism, operating means therefor, a regulating means for said mechanism, a vertically-movable controlling means for said regulating means, means for operating the controlling means, and means for suitably locking said controlling means.

33. A machine of the character described comprising a series of controlling-blocks, operating means for said blocks, and means independent of said operating means for suitably locking and controlling one or more of said blocks.

34. A machine of the character described, comprising a series of controlling-blocks, and means controlled by the diameter of a coin for suitably locking and controlling one or more of said blocks.

35. In a machine of the character described, a change-ejecting mechanism, a plurality of controlling-blocks, a plurality of regulating-bars mounted above and adapted to be operated by said controlling-blocks, said bars adapted to regulate the movement of the ejecting mechanism, operating means for said blocks, and operating means for said ejecting mechanism.

36. In a machine of the character described, a change-ejecting mechanism, a plurality of controlling-blocks, a plurality of regulating-bars mounted above and adapted to be operated by said controlling-blocks, said bars adapted to regulate the movement of the ejecting mechanism, operating means for said blocks, operating means for said ejecting mechanism, and means for suitably locking and controlling the said blocks.

37. In a machine of the character described, a change-ejecting mechanism, a plurality of controlling-blocks, a plurality of regulating-bars mounted above and adapted to be operated by said controlling-blocks, said bars adapted to regulate the movement of the ejecting mechanism, operating means for said blocks, operating means for said ejecting mechanism, and means controlled by the diameter of a coin for suitably locking and controlling said blocks.

38. In a machine of the character described, a cash receiving and separating mechanism, a change-ejecting mechanism, operating means for said mechanisms, a plurality of controlling-blocks, a plurality of regulating-bars for said ejecting mechanism, said bars adapted to be operated by said blocks, and operating means for said blocks.

39. In a machine of the character described, a cash receiving and separating mechanism, a change-ejecting mechanism, operating means for said mechanisms, a plurality of vertically-movable controlling-blocks, a plurality of regulating-bars for said ejecting mechanism, said bars adapted to be operated by said blocks, and operating means for said blocks.

40. In a machine of the character described, a cash receiving and separating mechanism, a change-ejecting mechanism, operating means for said mechanisms, a plurality of vertically-movable controlling-blocks, a plurality of regulating-bars for said ejecting mechanism, said bars adapted to be operated by said blocks, operating means for said blocks, and means for suitably locking and controlling one or more of said blocks.

In testimony whereof I have hereunto set my hand in presence of two subscribing witnesses.

EDWIN H. SPEAR.

Witnesses:
H. D. JAMESON,
A. NUTTING.